Patented Jan. 15, 1952

2,582,614

UNITED STATES PATENT OFFICE 2,582,614

REACTION PRODUCTS OF INGREDIENTS COMPRISING A POLYETHYLENE MELAMINE AND AN ETHYLENE UREA

Henry P. Wohnsiedler, Darien, and Edward L. Kropa, Old Greenwich, Conn., assignors to American Cyanamid Company, New York, N. Y., a corporation of Maine No Drawing. Application November 25, 1950, Serial No. 197,640

13 Claims. (Cl. 260—2)

This invention relates to the production of new synthetic materials and, more particularly, new resinous (or potentially resinous) compositions which are especially suitable for use in the plastics and coating arts. Still more particularly the invention is concerned with compositions comprising the product of reaction of ingredients comprising (1) a polyethylene melamine (diethylene melamine or triethylene melamine) and an ethylene urea, more particularly a mono-ethylene urea or a polyethylene urea, e. g., N-ethylene urea, N-octadecyl-N'-ethylene urea, 2,4-tolylene diethylene urea, N,N'-diethylene urea, etc. The ethylene ureas used in practicing the present invention contain a cyclic ethylene grouping, that is to say, the ethylene grouping or groupings attached to the nitrogen atom or atoms of the urea are part of a three-membered ring structure. In other words, the ethylene grouping replaces the two hydrogen atoms attached to the nitrogen atom of an amide grouping and, together with said nitrogen atom, forms a three-membered ring. The scope of the invention also includes method features. Instead of diethylene melamine or triethylene melamine alone, a mixture of these polyethylene melamines in any proportions can be used as the reactant with the ethylene urea. Likewise, instead of a single ethylene urea, a plurality (one, two, three, four or any desired number) of different ethylene ureas, e. g., a mixture of a mono-ethylene urea and a polyethylene urea in any proportions can be used as a reactant with either diethylene melamine, triethylene melamine or a mixture of diethylene and triethylene melamines in any proportions. Likewise, the reaction between the primary reactants can be conducted while in the presence of (i. e., in intimate contact with) other ingredients which are either inert during the reaction or are reactive with either or both of the main reactants.

Triethylene melamine is a known compound and can be prepared, for example, by the method described in Wystrach and Kaiser Patent No. 2,520,619. It can be represented by the following formula:

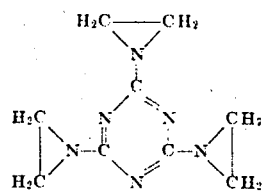

Diethylene melamine can be represented by the following formula:

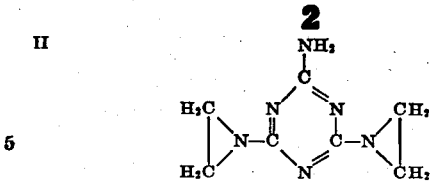

It can be prepared, for instance, as described in the copending application of Donald W. Kaiser and Frederic Schaefer, Serial No. 165,861, filed June 2, 1950. The polyethylene melamines employed in practicing the present invention may be described as being s-triazine (1,3,5-triazine) derivatives wherein at least two of the amino nitrogen atoms of a polyamino-s-triazine each has one ethylene group attached thereto instead of the two hydrogen atoms.

It is an object of the present invention to prepare a new class of synthetic materials, more particularly resinous compositions, which have particular utility in the plastics and coating arts, e. g., as coating, laminating, adhesive, impregnating, casting and molding compositions as well as in other applications, for instance in the treatment of textiles, paper, etc. They also can be used as components of plastics and coating compositions. Other objects of the invention will be apparent to those skilled in the art as the description of the invention proceeds.

The present invention is based on our discovery that new and valuable materials for use in coating, molding and other applications can be prepared by effecting reaction (more particularly, under heat) between ingredients comprising (1) diethylene melamine and/or triethylene melamine and one or more ethylene ureas, alone or while admixed with one or more other active or inactive modifying bodies, e. g., an alcohol (monohydric alcohol or a polyhydric alcohol, or a mixture thereof), an amine, an amide, etc. Some of the reaction products of this invention, when polymerized or co-reacted only to a relatively low degree or extent, are soluble in various solvents, becoming insoluble upon further advancement of polymerization or co-reaction, that is, become substantially completely cured. Others of our new synthetic compositions, as initially prepared, are thermosetting in nature and can be cured under heat in the form of films or moldings without the aid of a curing catalyst. In such cases, a relatively low temperature for curing is usually required. This is a matter of considerable practical importance in the curing or setting of coating, impregnating and laminating compositions, as well as with molding compositions.

Two types of reactions can, and probably do, take place when at least one of the reactants contains an

or an —NH₂ group, namely, an addition reaction between the ethyleneimino groups of the one reactant and the

or —NH₂ group of the other reactant, as well as copolymerization between the ethyleneimino groups of the two reactants similar to that which occurs in the copolymerization of two or more different vinyl compounds. When ethyleneimino groups are the only substituents attached to nitrogen of the individual reactants, e. g., triethylene melamine and N,N'-diethylene urea, then the reaction which takes place is probably solely of the nature of a copolymerization reaction. Of course it will be apparent to those skilled in the art that when reactive materials, such as amines, amides, monohydric alcohols, polyhydric alcohols, etc., also are components of the reaction mass, the nature of the reaction is much more complex and that addition and copolymerization reactions probably compete with each other in the formation of the final reaction product.

The proportions of the reactants can be widely varied depending, for example, upon the particular properties desired in the final product, the rapidity with which it is desired that the reaction should proceed, and other influencing factors. For example, the polyethylene melamine and ethylene urea reactants can be used in approximately equimolecular proportions or in molar proportions ranging, for instance, from 0.1:10 to 10:0.1, more particularly from 1:4 or 5 to 4 or 5:1. In general, the polyethylene melamine and ethylene urea are employed in weight ratios ranging from 5 to 95% of the one to from 95 to 5% of the other. Larger or smaller weight ratios can be used as desired or as the particular characteristics wanted in the end product may require.

The temperature of the reaction also can be widely varied depending, for instance, upon the particular reactants employed, the rapidity of reaction wanted, the particular properties desired in the reaction product, and other factors. For example, the reaction temperature can be varied from room temperature (20°–30° C.) up to and including the boiling point of the reaction mass when the reaction is effected in accordance with the preferred technique, that is, while the primary reactants are dissolved or suspended in an active or inert liquid medium. The temperature is preferably controlled or regulated at a low point to initiate reaction while retaining a high measure of solubility. At later and final stages the temperature may be increased in order to advance the reaction to the desired point or to completion more rapidly. Usually the reaction is carried out under heat, e. g., at a temperature of at least 40° or 50° C. Especially when the reactants consist solely of a polyethylene melamine and an ethylene urea, the temperature should not be so high that reaction takes place with excessive violence.

The reaction can be effected in the absence of a solvent or other additive, or in the presence of (i. e., intimately associated with) an inert solvent (e. g., benzene, toluene, xylene, dioxane, acetone, ethyl methyl ketone, methyl isobutyl ketone, chlorobenzene, chloroform, ethylene dichloride, etc.), or in the presence of an active liquid medium, that is, one which is capable of entering into the reaction, for instance alcohols represented by the formula R—OH, where R represents a monovalent hydrocarbon radical, examples of which are given (as well as of alcohols embraced by the formula R—OH) in our copending application Serial No. 197,638, filed concurrently herewith; or in the presence of one or more of the various liquid alcohol-ethers, for example, ethylene glycol monomethyl ether, ethylene glycol monoethyl ether, diethylene glycol monomethyl ether, diethylene glycol monoethyl ether and others embraced by the formula R'—(OR")ₙ—OH where R' represents a monovalent hydrocarbon radical, R" represents a member of the class consisting of divalent aliphatic hydrocarbon radicals and divalent aromatic-substituted aliphatic hydrocarbon radicals, and $n$ represents a positive integer. Additional examples of alcohol-ethers embraced by this formula are given in our aforementioned application Serial No. 197,638. Examples of other active media that can be present in the reaction mass, in addition to the polyethylene melamine and ethylene urea reactants, are mono-, di- and triethanolamines, proplyamine, dipropylamine, isopropylamine and other nitrogenous compounds that are reactive with ethyleneimino groups and of which numerous examples are given in our copending application Serial No. 197,637 also filed concurrently with the present application.

An inert or active liquid (or liquefiable) medium or additive, if employed, can be used in any suitable amount ranging, for instance, from 0.02 to 40 or 50 times that of the weight of the primary reactants, that is, of the total weight of the polyethylene melamine and ethylene urea. Good results are obtainable when the inert or active liquid medium is employed in an amount such that the primary reactants constitute from about 20% to about 30 or 35% by weight of the reaction mass. At the end of the reaction period, the inert or unreacted liquid medium can be removed in whole or in part, if desired, from the reaction mass by any suitable means, for example by distillation, decantation, etc., or the solid reaction product can be separated from the liquid component of the reaction mass by filtration, centrifuging, etc.

In order that those skilled in the art better may understand how the present invention can be carried into effect, the following examples are given by way of illustration and not by way of limitation. All parts and percentages are by weight.

*Example 1*

| | Parts |
|---|---|
| Triethylene melamine | 142.5 |
| N,N'-diethylene urea | 7.5 |
| Methyl alcohol | 450.0 | are heated together under reflux with stirring, being brought to initial reflux in 4 minutes. Refluxing is continued for about 2½ hours, yielding a solution of the reaction product of the above ingredients. This solution can be used as a coating composition or as a component of such compositions. It forms tack-free films upon drying, e. g., for 1½ hours at 105° C. or for a shorter period of time at 120°–150° C.

*Example 2*

| | Parts |
|---|---|
| Triethylene melamine | 135 |
| N-decyl-N'-ethylene urea | 15 |
| Ethyl alcohol | 450 |

The same general procedure is followed as described under Example 1, the total period of heating under reflux at boiling temperature being 1½ hours. The solution comprising the reaction product of the above ingredients dries to a hard film. In addition to its use as a coating composition or as a component thereof, it also can be employed as a textile-treating agent, e. g., in imparting shrink-resisting characteristics to cotton, wool and other textiles.

Example 3

| | Parts |
|---|---|
| Diethylene melamine | 285 |
| 2,4-tolylene diethylene urea | 15 |
| Ethylene glycol | 105 |
| Dioxane | 1000 | are heated together in an open reaction vessel, which is heated in an oil bath, for 2 hours at a bath temperature of 165° C., yielding a gelled reaction product of the diethylene melamine, 2,4-tolylene diethylene urea and ethylene glycol.

Example 4

The ethylene urea used in this example is isopropylidene bis(p - N - phenyl - N' - ethylene urea), the formula for which is

III

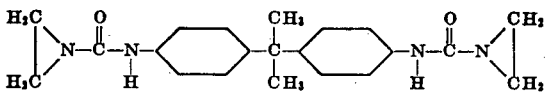

| | Parts |
|---|---|
| Diethylene melamine | 290 |
| Isopropylidene bis(p-N-phenyl- N'-ethylene urea) | 10 |
| Phenol | 159 |
| Dioxane | 1000 | form a viscous, amber-colored resinous mass after being heated together for 2½ hours at a slowly increasing temperature up to 170° C. This resin is thermoplastic in nature, and advantageously can be used as a modifier of other synthetic resins to improve their plasticity or flow characteristics.

When Examples 1 to 4, inclusive, are repeated in the absence of the hydroxy compound employed in the individual example, and, in the case of Example 4, also in the absence of dioxane, the reaction between the polyethylene melamine and the ethylene urea proceeds vigorously (in some cases, violently), and is more difficult to control than when the active or, as in Example 4, both active and inert liquid media are present in the reaction mass.

Example 5

| | Parts |
|---|---|
| Triethylene melamine | 75.0 |
| N,N'-diethylene urea | 75.0 |
| n-Butylamine | 53.6 |
| Ethanol | 600.0 | are heated together at refluxing temperature for 40 minutes. The solution of the resulting reaction product is pressure-filtered to remove any insoluble material that may be present. Films produced by baking samples of the filtered solution for 1½ hours at 105° C. and for the same time at 120° C. show good hardness, those baked at the higher temperatures having better water resistance than those which are heated at 105° C.

Example 6

Example 5 is repeated but instead of using 75 parts of triethylene melamine there are used 37.5 parts of diethylene melamine and 37.5 parts of triethylene melamine. Similar results are obtained.

Example 7

| | Parts | Approx. Molar Ratio |
|---|---|---|
| Triethylene melamine | 100 | 1.0 |
| N-octadecyl ethylene urea | 83 | 0.5 |
| Ethyl alcohol | 550 | |
| n-Butylamine (catalytic reactant) | 10 | |

All the above ingredients with the exception of the n-butylamine are heated together under reflux, with stirring, at the boiling temperature of the reaction mass for 75 minutes, after which the n-butylamine is added and refluxing is continued for another 45 minutes. The reaction appears to be complete after refluxing for a total of 100 minutes, as evidenced by the fact that a sample taken from the reaction mass at the end of this time remains clear when cooled, which is likewise true of a sample taken at the end of the total reaction period. The solution forms a "frosty" residue when a drop is applied to a glass base and dried.

Samples of the aforementioned solution are flowed upon panels, air-dried for about 16 hours and then baked for 1½ hours at 105° C. in one case and for the same length of time at 120° C. in another case. Fairly clear, continuous films are produced by both baking treatments. The baked films have good flexibility characteristics, as shown by the fact that the 105° C.-baked film can be bent about a ⅛-inch mandrel without cracking, while the one which is baked at 120° C. shows only very slight cracking when similarly bent about a ⅛-inch mandrel. The baked films are unaffected after immersion in water for 24 hours at room temperature. The solution comprising the reaction product of this example is stable for a period of at least 5 weeks. This solution is useful not only as a coating composition or as a component of such compositions, but also is very valuable as a laminating and impregnating varnish, and for treating textiles (cotton, wool, rayon, etc.) to improve their useful properties, e. g., resistance to shrinking and creasing, resistance to water, etc.

It will be understood, of course, by those skilled in the art that our invention is not limited to the specific reactants, proportions of reactants and conditions of reaction given by way of illustration in the foregoing examples. For instance, in any of the examples wherein diethylene melamine has been used, we can employ an equivalent amount of triethylene melamine; also, in any of the examples wherein triethylene melamine has been used, we can use an equivalent amount of diethylene melamine; furthermore, in any of the examples wherein a single polyethylene melamine has been employed, we can use in lieu thereof a mixture of diethylene melamine and triethylene melamine in any proportions, as will be apparent to those skilled in the art. Likewise, ethylene ureas other than those set forth in the individual examples, or mixtures thereof in any proportions, can be used instead of the particular ethylene urea employed in a particular example.

Illustrative examples of ethylene ureas that can be used in practicing the present invention (and it is distinctly to be understood that these are merely exemplary and not limiting in nature) are those represented by the formula

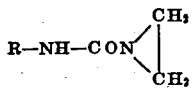

IV
$$R-NH-CO-N\begin{array}{c}CH_2\\|\\CH_2\end{array}$$

where R represents a monovalent hydrocarbon radical, for instance aliphatic (e. g., methyl, ethyl, propyl, isopropyl, butyl, isobutyl, sec.-butyl, butenyl, butynyl, amyl, isoamyl, hexyl, octyl, decyl, dodecyl, octadecyl, allyl, methallyl, crotyl, oleyl, linalyl, etc.), including cycloaliphatic (e. g., cyclopentyl, cyclopentenyl, cyclohexyl, cyclohexenyl, cycloheptyl, etc.), aryl (e. g., phenyl, biphenylyl or xenyl, naphthyl, etc.); aliphatic-substituted aryl (e. g., tolyl, xylyl, ethylphenyl, 2-butenylphenyl, tert.-butyl-phenyl, etc.); and aryl-substituted aliphatic (e. g., benzyl, cinamyl, phenylethyl, tolylethyl, phenylpropyl, etc.).

Other examples of ethylene ureas that can be used include N-ethylene urea (sometimes designated as "ethylene urea"), 1,4-tetramethylene diethylene urea, 1,6-hexamethylene diethylene ura, 1,8-octamethylene diethylene urea, 1,4-cyclohexylene diethylene urea and others embraced by the general and specific formulas given in, for example, the following patents: 2,265,416, 2,302,288, 2,312,863, 2,317,965, 2,327,760, 2,341,413, and 2,390,165.

As indicated hereinbefore and as further shown by a number of the examples, the properties of the fundamental resinous or non-resinous reaction products of this invention can be varied widely by introducing other modifying bodies before, during or after effecting reaction between the primary components. Thus, as modifying agents we may use, for instance, monohydric alcohols, e. g., methyl, ethyl, propyl, isopropyl, butyl, hexyl, n-octyl, 2-ethylhexyl, decyl, dodecyl, cetyl, lauryl, capryl or tetrahydrofurfuryl alcohol, pentanol or mixtures of isomeric pentanols (which mixtures also may include n-pentanol), cyclohexanol, methyl cyclohexanol, etc.; polyhydric alcohols, e. g., glycerol, pentaerythritol, dipentaerythritol, mannitol, sorbitol, ethylene glycol, diethylene glycol and others such as are disclosed, for example, in Schaefer Patent No. 2,481,155; alcohol-ethers, e. g., ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, etc.; hydrocarbon amines, alkanol amines, amides and other nitrogenous compounds of the kind disclosed in our copending application Serial No. 197,637; and the like.

Illustrative examples of other modifying bodies that can be incorporated into the fundamental reaction products, during their preparation or after they have been formed, are melamine-aldehyde condensation products (e. g., melamine-formaldehyde condensation products), urea-aldehyde condensation products (e. g., urea-formaldehyde condensation products), urea-melamine-aldehyde condensation products (e. g., urea-melamine-formaldehyde condensation products), protein-aldehyde condensation products, aminodiazine-aldehyde condensation products, aminotriazole-aldehyde condensation products, aniline-aldehyde condensation products, phenol-aldehyde condensation products (e. g., phenol-formaldehyde condensation products), furfural condensation products, modified or unmodified, saturated or unsaturated polyhydric alcohol-polycarboxylic acid reaction products, ester gums, water-soluble cellulose derivatives, natural gums and resins such as shellac, rosin, etc.; polyvinyl compounds such as polyvinyl alcohol, polyvinyl esters (e. g., polyvinyl acetate, polyvinyl butyrate, etc.), polyvinyl ethers, including polyvinyl acetals, e. g., polyvinyl formal, polyvinyl butyral, etc.

Coating compositions may be prepared from the thermosetting or potentially thermosetting resinous compositions of this invention alone or admixed with melamine-formaldehyde resins, fatty oil or fatty oil acid-modified alkyd resins, or other film-forming materials commonly used in protective coating compositions. For example, a coating composition may be made containing, for instance, from 15 to 95 parts by weight of a thermosetting or potentially thermosetting resin of the kind with which this invention is concerned and from 85 to 5 parts of a fatty oil or fatty oil acid-modified alkyd resin, numerous examples of which are given, for example, in Moore Patent No. 2,218,474, issued October 15, 1940.

Dyes, pigments, driers, curing agents (in some cases where a more accelerated cure is desired), plasticizers, mold lubricants, opacifiers and various fillers (e. g., wood flour, glass fibers, asbestos, mineral wool, mica dust, powdered quartz, titanium dioxide, zinc oxide, talc, China clay, carbon black, etc.) may be compounded by conventional practice with the synthetic materials of our invention, as desired or as conditions may require, in order to provide a coating, molding or other composition best adapted to meet a particular service use. For additional and more detailed information concerning the modifying ingredients that may be employed in producing coating compositions from our new resins, reference is made to the aforementioned Moore patent.

The modified and unmodified reaction products, more particularly resinous reaction products, of this invention have a wide variety of uses. For example, in addition to their use in the production of coating and molding compositions, they may be employed as modifiers of other natural and synthetic resins, e. g., urea-formaldehyde, melamine-formaldehyde and other resins (or molding compositions produced therefrom) where an improvement in properties for a particular purpose is desired.

The soluble resins of this invention also can be dissolved in appropriate solvents. Some of the solvents that may be employed to dissolve a particular reaction product of our invention include benzene, toluene, xylene, amyl acetate, butanol, methyl ethyl ketone, etc. The dissolved resins can be used as laminating varnishes in the production of laminated articles wherein sheet materials, e. g., paper, cloth, sheet asbestos, etc., are coated or coated and impregnated with the resin solution, superimposed and thereafter united under heat and pressure. They also can be employed as an adhesive in making laminated plywood, as an impregnant of pulp preforms from which molded articles thereafter are made by subjecting the impregnated preform to heat and pressure, as impregnants for electrical coils and for other electrically insulating applications, for bonding together abrasive grains in the production of resin-bonded abrasive articles such, for instance, as grindstones, sand papers, etc., in the manufacture of electrical resistors, etc. They also can be used for treating textile materials (e. g., cotton, linen, rayon and other cellulose-containing textiles, wool, silk and other natural or synthetic proteinaceous textiles, including nylon and textiles derived from polyacrylonitrile and acrylonitrile copolymers, and from casein, soyabeans, etc.), in filament, thread, yarn, fabric (woven or felted) or other form, in order to improve the properties of such textile materials, e. g., to increase the stiffness, to increase the service life, to impart shrinkage resistance thereto, or otherwise to enhance the properties of the treated materials and to make them more useful or serviceable to the ultimate user. They also may be employed for treating leather in order to improve its appearance and physical properties.

We claim:

1. A composition comprising the product of reaction of ingredients comprising (1) a polyethylene melamine which is a polyamino-s-triazine wherein at least two of the amino nitrogen atoms each has one ethylene group attached thereto instead of the two hydrogen atoms and (2) an ethylene urea wherein an ethylene radical replaces the two hydrogen atoms attached to the nitrogen atom of an amide grouping and, together with said nitrogen atom, forms a three-membered ring, the ingredients of (1) and (2) being employed in molar proportions ranging from 0.1:10 to 10:0.1.

2. A composition as in claim 1 wherein the polyethylene melamine is diethylene melamine, the formula for which is

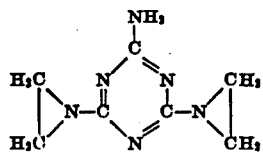

3. A composition as in claim 1 wherein the polyethylene melamine is triethylene melamine, the formula for which is

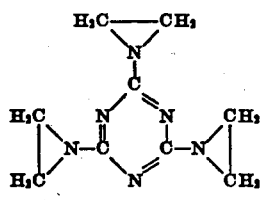

4. A composition as in claim 1 wherein the ethylene urea is a compound represented by the formula

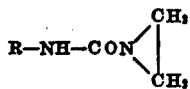

where R represents a monovalent hydrocarbon radical.

5. A composition comprising the resinous product of reaction of ingredients comprising (1) triethylene melamine having the formula given in claim 3 and (2) N-octadecyl-N'-ethylene urea, the ingredients of (1) and (2) being employed in molar proportions ranging from 1:5 to 5:1.

6. A composition comprising the resinous product of reaction of ingredients comprising (1) a polyethylene melamine which is a polyamino-s-triazine wherein at least two of the amino nitrogen atoms each has one ethylene group attached thereto instead of the two hydrogen atoms and (2) 2,4-tolylene diethylene urea, the ingredients of (1) and (2) being employed in molar proportions ranging from 1:5 to 5:1.

7. A composition comprising the resinous product of reaction of ingredients comprising (1) a polyethylene melamine which is a polyamino-s-triazine wherein at least two of the amino nitrogen atoms each has one ethylene group attached thereto instead of the two hydrogen atoms and (2) N, N'-diethylene urea, the ingredients of (1) and (2) being employed in molar proportions ranging from 1:5 to 5:1.

8. A composition comprising the product of reaction of ingredients comprising (1) a polyethlene melamine which is a polyamino-s-triazine wherein at least two of the amino nitrogen atoms each has one ethylene group attached thereto instead of the two hydrogen atoms, (2) an ethylene urea wherein an ethylene radical replaces the two hydrogen atoms attached to the nitrogen atom of an amide grouping and, together with said nitrogen atom, forms a three-membered ring, and (3) an alcohol, the polyethylene melamine of (1) and the ethylene urea of (2) being employed in molar proportions ranging from 0.1:10 to 10:0.1 and the alcohol of (3) being employed in an amount ranging from 0.02 to 50 times that of the total weight of the reactants of (1) and (2).

9. A composition as in claim 8 wherein the alcohol of (3) is one represented by the formula R—OH where R represents a monovalent hydrocarbon radical.

10. A composition comprising the resinous product of reaction of ingredients comprising (1) triethylene melamine having the formula given in claim 3, (2) N-octadecyl-N'-ethylene urea and (3) an alcohol represented by the formula R—OH where R represents a monovalent hydrocarbon radical, the ingredients of (1) and (2) being employed in molar proportions ranging from 1:5 to 5:1 and the alcohol of (3) being employed in an amount ranging from 0.02 to 50 times that of the total weight of the ingredients of (1) and (2).

11. A composition as in claim 10 wherein the alcohol of (3) is ethyl alcohol.

12. The method of preparing a new synthetic composition which comprises effecting reaction under heat between ingredients comprising (1) a polyethylene melamine which is a polyamino-s-triazine wherein at least two of the amino nitrogen atoms each has one ethylene group attached thereto instead of the two hydrogen atoms and (2) an ethylene urea wherein an ethylene radical replaces the two hydrogen atoms attached to the nitrogen atom of an amide grouping and, together with said nitrogen atom, forms a three-membered ring, the ingredients of (1) and (2) being employed in molar proportions ranging from 0.1:10 to 10:0.1.

13. A method as in claim 12 wherein the reaction is effected in the presence of a small amount of an amine as a catalytic reactant for accelerating the reaction.

HENRY P. WOHNSIEDLER.
EDWARD L. KROPA.

REFERENCES CITED

The following references are of record in the file of this patent:

UNITED STATES PATENTS

| Number | Name | Date |
|---|---|---|
| 2,524,727 | Dudley | Oct. 3, 1950 |

OTHER REFERENCES

Smith: Synthetic Fiber Developments in Germany (Textile Research Institute) 1946, pp. 874–76.